April 1, 1969 R. R. HABERECHT 3,436,468
PLASTIC BODIES HAVING REGIONS OF ALTERED CHEMICAL STRUCTURE AND METHOD OF MAKING SAME
Filed May 28, 1965
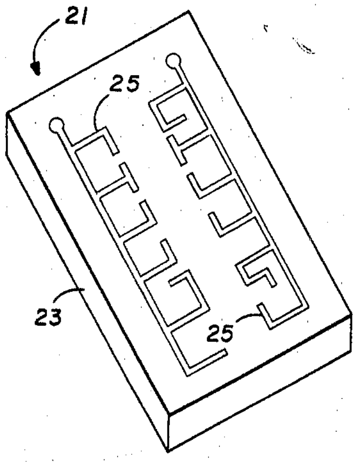
FIG. 3
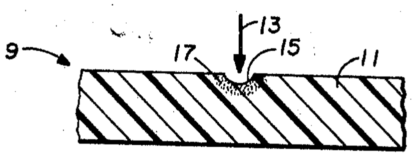
FIG. 1
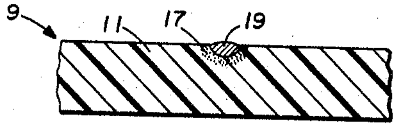
FIG. 2
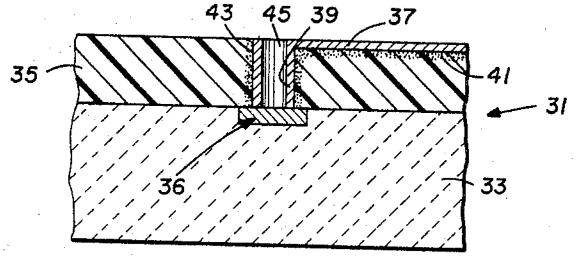
FIG. 4
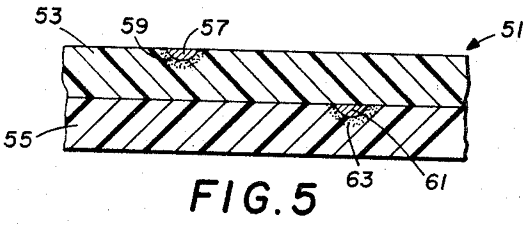
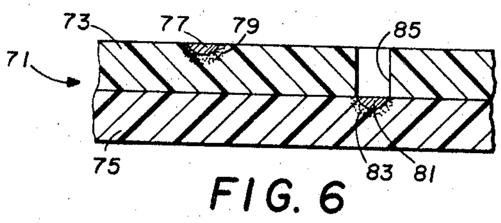
FIG. 6
INVENTOR
ROLF R. HABERECHT
BY William D. Harris, Jr.
ATTORNEY 3,436,468

PLASTIC BODIES HAVING REGIONS OF ALTERED CHEMICAL STRUCTURE AND METHOD OF MAKING SAME

Rolf R. Haberecht, Richardson, Tex., assignor to Texas Instruments Incorporated, Dallas, Tex., a corporation of Delaware Filed May 28, 1965, Ser. No. 459,553
Int. Cl. H05k *1/00*
U.S. Cl. 174—68.5 17 Claims

ABSTRACT OF THE DISCLOSURE

This specification discloses a method of forming intricate patterned circuits on a dielectric organic polymer characterized by exposing selected paths of the polymer to a high energy electron beam, followed by the step of electrolessly depositing the metal onto the paths that have been exposed to electron beams. The metal does not electrolessly deposit on the polymer generally but only along the paths exposed to the electron beam. Multiple layers of polymer may be stacked to form a stacked multi-layer circuit board. The circuit boards produced by the method are also disclosed.

This invention relates to plastic bodies or members having regions of altered chemical structure and to the method of making same. More specifically, it relates to bodies comprising a dielectric organic solid polymer member having altered regions which may have a metallic conductor joined to such altered regions, and to the method of making such bodies.

Organic solid polymer materials, hereinafter often referred to as "plastic," are relatively inexpensive and may be simply fabricated into a wide variety of configurations. Moreover, they may be rather easily applied as a film to cover a substrate of a dissimilar material. If desired, a body may be prepared that consists of a multiplicity of layers of plastic.

Since plastic is a dielectric material, it is useful as an insulator, support, or substrate for various electrical circuits. It is difficult, however, to securely connect or dispose the circuit with respect to the plastic. Difficulty is particularly encountered if an attempt is made to embed circuit paths in, or adhere circuit paths to, plastic material if miniaturized circuits are involved.

An object of the present invention is to provide a plastic body, or body portion, having conductive regions adhered thereto in a relatively simple and efficient manner. It is a further object to provide such a plastic body, or body portion, which carries circuit patterns that are tightly adhered to the body. A further object is to provide such structure in which the circuit patterns may be of complex and highly microminiaturized configuration, including quite narrow circuit paths having a high degree of resolution. Yet a further object is to provide a method of making structure achieving the foregoing objects.

Stated somewhat differently, an object is to provide plastic bodies or members having regions of altered chemical structure which may, if desired, thereafter be preferentially processed, for example, preferentially plated to adhere metal to only the regions of altered chemical structure.

In accordance with the present invention, a body is provided which comprises a dielectric organic polymer member having a region of lowered resistance autogenously formed therein. The region carries metal plating.

The method aspects of the present invention include a process for forming a zone of comparatively low resistance for a dielectric organic solid polymer member. The process involves the step of selectively impinging a stream of concentrated energy on a part only of the polymer member to locally form altered chemical structure. Preferably a subsequent step of plating metal to the altered chemical structure is conducted.

Preferably the concentrated energy source utilized is an electron beam and the plating is selectively accomplished by electrolessly plating from an electroless plating solution. Nickel and copper are the preferred metals applied by such technique.

For a more complete understanding of the present invention and for further objects and advantages thereof, reference may now be had to the following description taken in conjunction with the accompanying drawings in which:

FIGURES 1 and 2 are schematic sectional fragmentary elevational views illustrating sequential steps in the process of the present invention; FIGURE 1 showing formation of regions of altered chemical structure and FIGURE 2 showing the structure of FIGURE 1 after plating is completed;

FIGURE 3 is a pictorial view of a circuit board in accordance with the present invention;

FIGURE 4 is a schematic sectional fragmentary elevational view illustrating a composite body of plastic and semiconductor, the plastic portion carrying conductive paths in accordance with the present invention;

FIGURE 5 is a schematic sectional elevational fragmentary view of a composite body made of two layers of plastic, each carrying conductive paths, in accordance with the present invention; and FIGURE 6 is a schematic sectional elevational fragmentary view of a composite body made of two layers of plastic, each carrying conductive paths, but formed in accordance with a different application of the method aspect of the present invention than the body of FIGURE 5.

Turning now to FIGURE 1, therein is illustrated a portion of a solid body 9 being processed in accordance with the present invention. Body 9 includes the plastic base or substrate portion 11. An electron beam, schematically illustrated by the arrow 13, is bombarding a surface region of the plastic substrate 11. Note that exposure to the beam 13 has caused a slight depression or trench 15 to form where the beam has impinged upon the plastic substrate. The depth of this trench may be regulated, according to the extent of exposure to the beam. By controlling exposure to a minimum, the trench can be essentially eliminated. The region of the substrate 11 which is exposed to the beam is changed in nature by the highly localized but concentrated energy produced by the beam.

Plastic substrate 11 is made of an organic solid polymer. The concentration energy introduced locally by the electron beam locally decomposes the polymer to alter its chemical structure. Generally, some free carbon has been observed among the decomposition products. An altered region is schematically illustrated in FIGURE 1 by the stippled zone 17, which extends inwardly into the structure of the plastic substrate 11 a short distance from the small depression 15 formed on the surface of the body by the beam 13. The altered region is found to have a lower resistivity than before it was chemically changed by the electron beam.

After exposure to the beam, as illustrated in FIGURE 1 and discussed above, the body 9 is immersed in an electroless plating solution, for example, a standard electroless nickel plating solution. After remaining in the solution for a predetermined period, depending upon the thickness desired, the body 9 is removed from the solution and it is found that metal plating has formed only on the altered region 17. The resulting metal plated region 19, overlaying the altered region 17, is shown in FIGURE 2, which schematically represents the appearance of the product from the plating step.

It should be appreciated that a variety of useful structures may be made, based on the foregoing technique. For example, a circuit board may be constructed utilizing plastic as the substrate material for the board. Such a board is illustrated in FIGURE 3 wherein the numeral 21 illustrates the circuit board generally. Circuit board 21 consists of the plastic substrate 23, which carries the conductive paths 25 on its upper surface. Each path 25 has the structure illustrated in FIGURE 2, and is formed in the manner illustrated in FIGURES 1 and 2. That is, each path consists of a region of altered chemical structure in the plastic substrate which carries metal plating tightly adhered to it. The altered region is thus seen to be an interlayer between the plastic substrate and metal plating. It will be understood that this interlayer is actually autogenously formed from the body of the plastic, as from the substrate 23, by decomposing it to form altered chemical structure in localized regions in accordance with the predetermined pattern corresponding to the ultimate desired circuit pattern. The metal plating for the circuit board 21 is then quite simply applied by immersing the entire board in an electroless plating solution and allowing preferential plating to occur on the chemically altered regions of the board. The resulting product, i.e., the circuit board 21, may then be utilized for a variety of circuit hookup applications. For example, semiconductor network packages and components may be soldered or otherwise adhered to the metallic paths 25 to define a desired completed circuit. The pattern of paths 25 is, of course, dependent upon the ultimate circuit desired; accordingly the pattern is chosen in advance and may be applied by impinging an electron beam on the plastic substrate by moving the beam over the substrate in accordance with the configuration of the desired pattern.

In many instances it is desirable to provide conductive paths for a plastic film or layer overlying a substrate of a dissimilar material. The substrate material, to which the plastic film or layer is joined, may be conductive, semiconductive, or dielectric in nature, as may be desired. Moreover, its structural properties may vary widely.

FIGURE 4 illustrates an exemplary section, schematic in nature, of a composite body 31 which includes a semiconductive substrate 33 having a plastic film or layer 35 overlying it. The substrate 33 may be formed, for example, of silicon or another semiconductor material such as gallium arsenide, and the plastic film, for example, may be epoxy polymer. The semiconductive substrate 33 carries a contact 36, formed in its upper surface by various means known in the art and not included within the scope of the present invention. Contact 36 provides electrical connection to various zones or regions within the semiconductive substrate 33, as may be required for a specific application of the structure.

Plastic layer 35 includes the planar conductive path 37 and the tubular path 39 which extends through the thickness of the layer. Tubular path 39 adjoins the planar path 37 adjacent the upper surface of the plastic layer 35. The altered region 41 directly underlies the planar conductive path 37. Concentric annular altered region 43 directly adjoins, and extends inwardly from, the tubular conductive path 39. Region 41 is autogenously formed by bombarding the body 35 with an electron beam, as previously explained herein, in accordance with the desired configuration of the circuit path 37. The altered region 43 is likewise formed by electron beam technique. To form region 43, the beam is focused in a region of the body corresponding to the ultimate location of the tubular conductive path 39 and exposure is continued until a hole 45 is drilled through the layer. As would be expected, formation of the hole is accompanied by, and largely made possible by, a large amount of decomposition in the region of beam exposure. While much decomposed material vaporizes and is totally removed from the proximity of the plastic layer 35 during the drilling of the hole, it has been observed that in some cases material remains along the surfaces which define the boundaries of the hole. Such decomposed material extends inwardly a short distance and defines the annular decomposed region 43.

Planar plating 37 and annular plating 39 are provided by immersing the body 31 in an electroless plating solution and permitting plating to occur until the desired thickness of metal is deposited on the altered regions 41 and 43. It will be observed that the plating 39 forms on the metallic contact 36, as well as on annular altered region 43. This causes bonding between contact 36 and tubular conductive path 39 and insures good electrical contact therebetween.

Multilayer structures may be fabricated in accordance with the present invention. Such a structure is illustrated by the section of the composite body 51 of FIGURE 5. Composite body 51 includes an upper plastic layer 53 and an adjoining lower plastic layer 55. The upper surface of the plastic layer 53 carires a metallic conductive path 57 which overlies the autogenously formed altered interlayer 59. A metallic conductive path 61 is disposed in the upper surface of the layer 55. Metallic path 61, in analogous fashion to metallic path 57, directly overlies and adjoins the autogenously formed altered region 63 in the lower plastic layer 55.

The structure of composite body 51 may be formed by the techniques previously discussed herein. First an electron beam is used to bombard the upper surface of the plastic layer 55 to locally alter chemical structure to lower resistivity in the altered regions. Thereafter, the layer 55 is immersed in an electroless plating solution and plating is conducted to preferentially apply the metallic conductive paths of 61 onto the altered region 63. Thereafter, the layer 53 is joined to the layer 55, as by pressure, fusion, or other suitable bonding techniques. An electron beam is then used to bombard the upper surface of the applied layer 53, and electroless plating is thereafter conducted on the resulting altered regions. The ultimate product obtained is the composite body 51.

An alternative approach to providing conductive paths at different levels is illustrated in FIGURE 6, which is a partial sectional view of a two-layer body 71. Body 71 includes an upper plastic layer 73 and a lower plastic layer 75. These layers are joined together by pressure, fusion, or other suitable means. An upper metallic conductive path 77 is plated onto an autogenously formed altered region 79 on the upper face of plastic layer 73. The technique previously described herein is utilized for forming this structure. Lower plastic layer 75 includes a metallic conductive path 81, which overlies and is firmly adhered to the altered region 83, autogenously formed from the lower plastic body 75 by bombardment with an electron beam. Note that in the formation of the altered region 83, a trench 85 is cut through the upper plastic layer 73. This may be accomplished with the electron beam. Generally, it is desirable to scrape or scribe the sides to minimize any plating which may tend to occur thereon in the course of the plating process. Alternatively, a masking material, for example, epoxy polymer, may be applied to the sides of the trench to eliminate plating. In any event, the composite body is immersed in a plating solution after formation of the altered region 83 and a metallic layer 81 plates over the region 83. The resulting structure is that of the composite body 71 of FIGURE 6.

If it is desired to interconnect a path at an upper level with one at a lower level in a plastic body or composite, the technique of drilling a hole and plating metal on the annular altered region bounding the hole may be followed. This is fully analogous to the procedure illustrated in FIGURE 4 and discussed in connection therewith.

The specific electron beam source utilized in the practice of an aspect of this invention is not critical. As an example, the following assembly, operated at the settings indicated, operated satisfactorily:

Machine—Carl Zeiss BFM100W, "Electron Milling Machine"
Vacuum—$1.8 \times 10^{-5}$ m. Hg
Pulse height—1
Pulse frequency—200 cycles per second
Pulse width—2.5, 4, or 6 (as desired)
Voltage—100 kv.
Current—20 microamps
Filament current setting—75

The present invention is applicable to a wide variety of plastics. The following are exemplary: epoxy polymer, polyimides, vinylites, and polyethylene terephthalate ("Mylar").

By the term "epoxy polymer" is meant a plastic material of the general type usually derived as the reaction product from bisphenol A and epichlorohydrin. Specific examples of commercially available epoxy that have been used are "G-10" and "G-11," available from the Formica Corporation. B-stage epoxy (i.e., partially cured) may be utilized in the practice of the present invention, if desired.

A specific example of a preferred imide which may be used in the practice of the present invention is polypyromellitimide, a product resulting from the poly condensation reaction between pyromellitic dianhydride and an acromatic diamine. A commercially available polypyromellitimide is known as "H-Film," and is available from DuPont. Further details on this material may be obtained from an article appearing in the Industrial and Engineering Chemistry, vol. 2, No. 3, September 1963, by Leonard E. Amborski, entitled "H-Film, A New High Temperature Dielectric."

Good results are obtained when the present invention is practiced with polyethylene terephthalate.

In the plating step used in the practice of a preferred embodiment of the present invention, various electroless plating solutions and techniques, known in the art, may be utilized. For example, nickel, copper, and gold electroless plating solutions may be used to plate these materials onto the altered regions in a plastic material formed by exposure to an electron beam. The following solution and technique is given merely as an example: The initial solution contains 3% $NiCl_2 \cdot 6H_2O$, 1% $NAH_2PO_2 \cdot H_2O$, 5% ammonium chloride, 10% sodium citrate, and 81% water (all percentages being by weight). To 100 volumes of the foregoing solution, 5 volumes of ammonium hydroxide are added and the solution is heated to 95° C., at which time 5 more volumes of ammonium hydroxide are added. The item to be plated is immersed in the solution, which is maintained at 95° C. during a plating period of one-half hour. Every six minutes during the plating period, 2 volumes of ammonium hydroxide are added to replace loss. At the end of the 30 minute plating period, the item is removed and washed with water and alcohol and air-dried.

As a further example, gold may be plated from a standard gold plating solution utilizing a plating time of 40 minutes, at a temperature ranging between 58° C. and 67° C. A satisfactory gold plating solution, designated "EL-221," is obtainable from the Shipley Corporation.

In summary, it has been seen that the present invention provides a body which comprises a dielectric organic polymer member having a region of lowered resistance autogenously formed therein. The region may be formed in accordance with a complex circuit path pattern, with quite narrow paths having high resolution. Preferably, the region carries metal plating.

Moreover, in accordance with a method aspect of the present invention, it has been seen that a process is provided for forming a zone of comparatively low resistance for a dielectric organic solid polymer member. The process involves the step of selectively impinging a stream of concentrated energy on a part only of the polymer member to locally alter the chemical structure. Preferably a subsequent step of plating metal to the altered chemical structure is conducted. An electron beam is the preferred source of concentrated energy.

What is claimed is:

1. The process of providing a conductive region for an organic solid polymer member comprising:
exposing a part only of said polymer member to a concentrated energy source to decompose polymer to form a comparatively less resistive region only, in the vicinity of said part; and
selectively plating metal only to said comparatively less resistive region.

2. The process of providing a conductive region for a dielectric organic solid polymer member comprising:
exposing a part only of said polymer member to a concentrated energy source to locally decompose polymer to form a region of lowered resistivity only in the vicinity of said part; and
contacting said member with an electroless plating solution to selectively plate metal on said region of lowered resistivity.

3. The process of forming a conductive path adhered to a body comprising a dielectric organic polymer member comprising:
bombarding said member with an electron beam in regions corresponding to the desired pattern for said conductive path to decompose organic polymer in said regions to lower the resistivity of said regions; and
immersing said body in an electroless plating solution and selectively electrolessly plating metal to said regions.

4. The process of claim 3 wherein the material of which said member is made is an epoxy polymer.

5. The process of claim 4 wherein the material of which said member is made is a polyimide polymer.

6. The process of claim 4 wherein the material of which said member is made is polyethylene terephthalate.

7. The process of claim 4 wherein the material of which said member is made is a polyvinyl polymer.

8. The process of claim 7 wherein said polymer consists essentially of polyvinyl chloride.

9. A body comprising a dielectric organic polymer portion, a metallic conductive region carried by said polymer portion, and an interlayer of said polymer that has been decomposed and of lower resistivity than of said polymer portion, said interlayer being between said polymer portion and said metallic conductive region, said interlayer being autogenous with said polymer portion and contiguous with and firmly adhered to said metallic conductive region.

10. The body of claim 7 in which said region is configured to define a conductive path.

11. The body of claim 10 wherein said path follows a circuit pattern of desired configuration, said path comprising a segment with a path no wider than on the order of about 10 mils.

12. The body of claim 10 further comprising a second polymer portion disposed against said polymer portion, a second metallic conductive region carried by said second polymer portion, and a second interlayer of lower resistivity than of the resistivity of said second polymer portion, said interlayer being between said second polymer portion and said second metallic conductive region, said second interlayer being autogenous with said second polymer portion and contiguous with and firmly adhered to said second metallic conductive region.

13. The body of claim 7 wherein the material of which said member is made is an epoxy polymer.

14. The body of claim 7 wherein the material of which said member is made is a polyimide polymer.

15. The body of claim 7 wherein the material of which said member is made is a polyvinyl polymer.

16. The body of claim 7 wherein said polyvinyl polymer is polyvinyl chloride.

17. The body of claim 7 wherein the material of which said member is made is polyethylene terephthalate.

References Cited

UNITED STATES PATENTS

| | | | |
|---|---|---|---|
| 2,690,403 | 9/1954 | Gutzeit et al. | 117—160 XR |
| 3,011,920 | 12/1961 | Shipley | 117—213 |
| 3,113,896 | 12/1963 | Mann | 117—212 XR |
| 3,119,707 | 1/1964 | Christy | 117—212 XR |
| 3,181,172 | 4/1965 | Boblett | 117—93.1 |
| 3,272,670 | 9/1966 | Myers | 117—93.1 |
| 3,296,359 | 1/1967 | Ramsey | 117—93.3 XR |

WILLIAM L. JARVIS, *Primary Examiner*.

U.S. Cl. X.R.

339—17; 117—212, 213, 47, 93.31; 156—278, 313; 161—184, 197